Feb. 21, 1933.  A. LYSHOLM  1,898,198

GEARING

Filed June 4, 1930  2 Sheets-Sheet 2

Patented Feb. 21, 1933

1,898,198

UNITED STATES PATENT OFFICE

ALF LYSHOLM, OF STOCKHOLM, SWEDEN, ASSIGNOR TO AKTIEBOLAGET LJUNGSTROMS ANGTURBIN, OF STOCKHOLM, SWEDEN, A SWEDISH JOINT-STOCK COMPANY

GEARING

Application filed June 4, 1930, Serial No. 459,203, and in Germany October 25, 1929.

Toothed gearings having two intermediate shafts are already known. In such toothed gearings having helical teeth difficulties always arise to uniformly distribute the engagement of the teeth of the wheels appertaining to the gearing on one hand and to obtain uniform tooth pressure independent of inaccuracies in the pitch of the teeth on the other hand.

In order to eliminate the difficulties experienced with existing uneven tooth-engagements, it has previously been proposed to journal the intermediate shafts in axially displaceable bearings which are connected with the shafts in such a manner that they follow these latter in axial displacements which are effected by manually adjusting the position of the bearings. It has also been proposed to arrange the bearings supporting the intermediate shafts in such a manner that the shafts are automatically adjusted for balancing the varying tooth-pressures which arise as a consequence to inaccuracies in the manufacture of the teeth. However, in these constructions difficulties remain in adjusting the intermediate shafts for obtaining uniform distribution of tooth-engagements.

The present invention relates to toothed gearings of the kind referred to and has for its object the provision of devices by means of which these drawbacks are eliminated.

The invention consists in that all or one of the toothed wheels arranged on the intermediate shafts and having helical teeth are axially displaceable in relation to the toothed wheels with which they cooperate, to such an extent that under working conditions the various toothed wheels on the intermediate shafts adjust themselves, without external manual adjustments, for even distribution of the tooth-engagements and preferably also for even distribution or balancing of the tooth-pressures. The invention further consists in that the intermediate shafts of the toothed wheels arranged on the latter are axially displaceably journalled in radial bearings, the axial movement of the toothed wheels being limited by resilient axial or thrust bearings which preferably make possible a displacement of the toothed wheels in relation to the wheels with which they cooperate, which displacement is at least 50, and preferably 100, times greater than the fault or faults in the teeth causing uneven tooth-pressure in the gearing.

Further characteristic features of the invention will be described in connection with the accompanying drawings.

Figure 1:
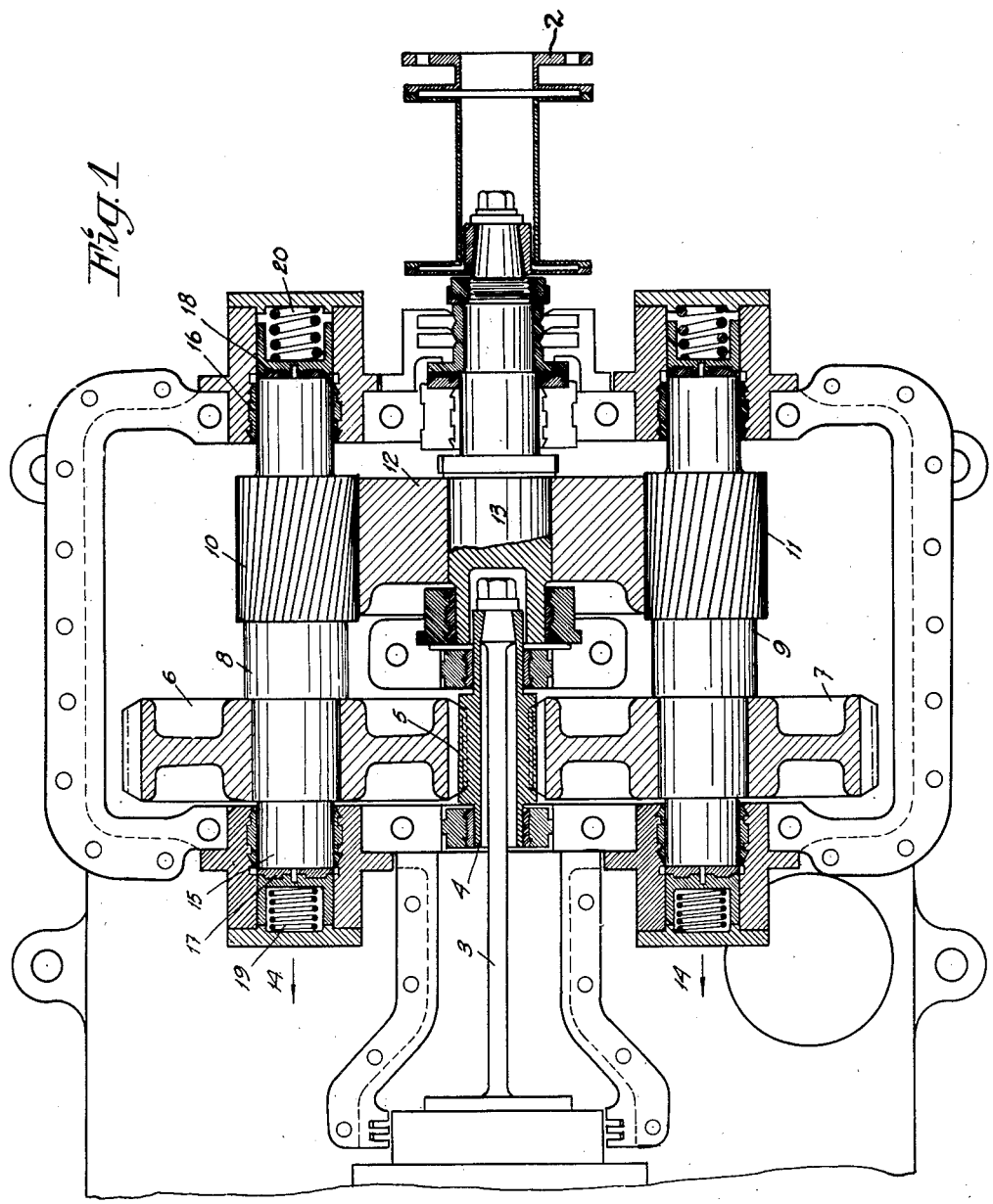
Figure 2:
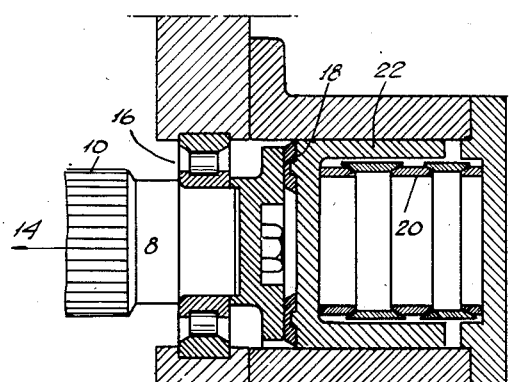
Figure 3:
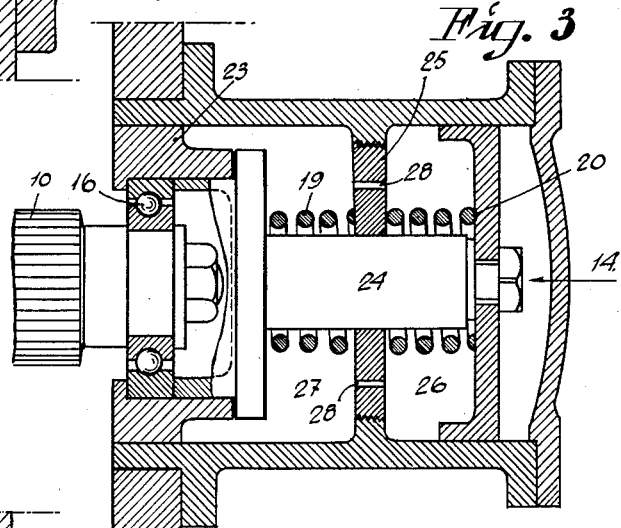
Figure 4:
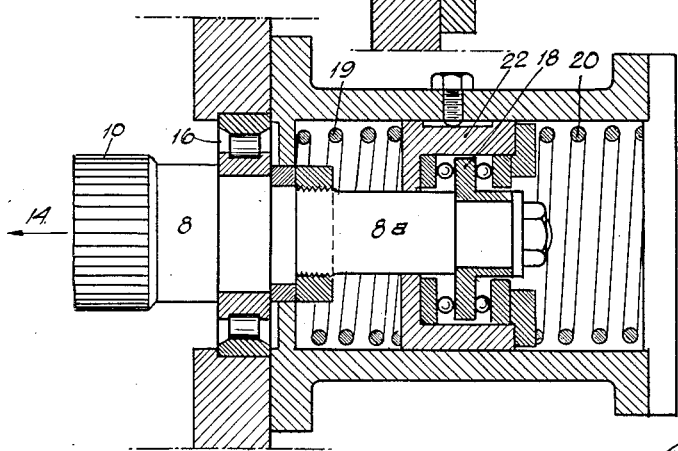

Fig. 1 shows a section through a toothed gearing according to the principle of the invention. Figs. 2, 3 and 4 show various embodiments of the invention in connection with the toothed gearing according to Fig. 1.

Referring to Fig. 1, a motor which drives the gearing is indicated at 1 and the coupling for the machine to be driven is indicated at 2. The motor, for instance a steam turbine or an electric motor, is coupled by means of a resilient device, for instance an elastic shaft 3, to the first and fastest rotating shaft 4 of the toothed gearing which, in the arrangement shown, constitutes the driving shaft. This shaft 4 carries a pinion or gear 5 which is in tooth-engagement with a toothed wheel or gear 6 and also with a toothed wheel or gear 7, each of the said toothed wheels being arranged on its intermediate shafts 8 and 9, respectively. On the same intermediate shafts are arranged two pinions or gears 10 and 11, respectively, which cooperate with the common toothed wheel or gear 12 which is arranged on a shaft 13 mounted in alignment with shaft 4. The shaft 13 is preferably connected by means of a resilient coupling 2 with the machinery which is to be driven and hence, in the arrangement shown, constitutes the driven shaft. The wheels or pinions arranged on the shafts have helical teeth, the angles of the teeth however being so chosen that the axial pressures substantially balance each other but leave a minor resultant axial pressure in the intermediate shafts 8 and 9, respectively, for example in the direction of the arrows 14. If special arrangements are not made with respect to the toothed wheels 6, 10, 7, 11 or with respect to the intermediate shafts 8 and 9, it will not be certain that even tooth-engagement will be present between these wheels and the pinion 5 and the toothed wheel 12, respectively. In starting the gearing, the pinion 5 drives the toothed wheel 6 and thus also the intermediate shaft 8 and the pinion 10. This latter pinion 10 drives the toothed wheel 12, when the tooth-engagement between these two members has been completed by the teeth contacting each other. At the same time the pinion 5 also drives the toothed wheel 7, the intermediate shaft 9 and the pinion 11. However, it is not certain that the pinion 11 will pass into tooth-engagement and contact with the toothed wheel 12 for driving in the direction of rotation, for the position of rotation of the toothed wheel 12 has been predetermined by the tooth-engagement with the pinion 10. If, however, the intermediate shafts 8 and 9 should be able to move in axial direction, even tooth-engagement and equal contact could be obtained. This movement has previously been proposed to be obtained by manually adjusting the bearing in which the intermediate shafts rest. Supposing further that, for instance the pinion 10 is in engagement and drives the toothed wheel 12, a fault, arisen for example in manufacturing the toothed wheel 12, may cause a minor faulty position of a tooth of the toothed wheel 12 amounting, for example, to about some hundredths of a millimeter. By this means increased or decreased tooth-pressure at a certain tooth will present itself between the pinion 5 and the toothed wheel 12 which latter in its turn will tend, on account of the teeth of the toothed wheel being helical, to displace, for example, the intermediate shaft 8 in axial direction. If there is no possibility to displace the shaft 8 in axial direction and if also the toothed wheel 12 is fixed in axial respects, great forces will act on the teeth, which are not desirable. In order to eliminate these forces, it has previously been proposed to permit the intermediate shaft 8 to make those small axial movements which are required for obtaining even tooth-pressure and for eliminating the detrimental forces which may arise on account of faults in the toothed gearing.

According to the principle of the invention, the toothed wheels 6 and 10, and 7 and 11 are journalled so as to be automatically displaceable for obtaining uniform tooth-engagement without the necessity of an external manual adjustment. In the embodiment shown on the drawings, this is obtained in such a manner that the intermediate shafts, on which the above-mentioned toothed wheels are securely fastened, are axially displaceably journalled in radial bearings, the axial movements, however, being limited by resilient axial or thrust bearings. The intermediate shaft 8 is journalled in two radial bearings 15 and 16, respectively, and is axially supported by two axial thrust bearings 17 and 18, respectively. These bearings are limited with respect to their movements by springs 19 and 20, respectively, which counteract the axial movement of the shaft. The spring 19 also absorbs the axial pressure which has been described above and is assumed to act in the direction of the arrow 14. Corresponding arrangement is to be found for the journalling of the intermediate shaft 9. The axial movements of the intermediate shafts are so great that they can be adjusted for uniform tooth-engagement between the pinions 10 and the toothed wheel 12 as well as between the toothed wheel 12 and the pinion 11. At increased load the axial forces are also increased, the direction of these forces being indicated by the arrows 14, so that the springs 19 have to resist increased pressure. If, on the other hand, the load again is decreased, these forces will also be decreased, the shafts then receiving a displacement on account of the expansion of the springs in a direction opposite to the arrows 14. A variation in the load, especially in the form of a thrust, will therefore be balanced by the sudden displacement of the shafts, which displacement preferably is also damped, according to the principle of the invention, by a damping device, for instance of a kind generally known.

In accordance with the embodiment as illustrated, the damping device consists in that the spaces, in which the springs 19 and 20, respectively, are situated, are filled with oil, preferably under pressure. The axial movement of the shaft will be retarded, because the oil must for each movement be pressed in or out of the spaces, in which the springs are situated. Especially in transmitting power at high speeds, such damping devices, as shown, are suitable.

In Figs. 2, 3 and 4 one (the right) journalling of one intermediate shaft only has been shown. The same references as used in Fig. 1 are to be found in these figures indicating like or corresponding parts.

According to Fig. 2, the shaft 8 is journalled in a radial bearing 16 which in this case consists of a roller-bearing. In this case it is supposed that the shaft 8 which is to be permitted to make an axial movement, will receive at increased load a movement in the direction opposite to the arrow 14. The shaft 8 is axially displaceable in the roller-bearing. The inner rim of the roller-bearing is fastened to the shaft 8 and follows the movement of the latter, the rollers running in a groove in the inner rim of the roller-bearing and following the movement of the shaft, while the outer rim of the roller-bearing is fixed to a stationary part. Thus, the axial movement takes place between the rollers and the outer rim. The thrust-bearing 18 is a common journal-bearing, for instance of the Mitchell-type, and arranged in conjunction with an axially movable, but non-rotatable sleeve or piston 22. The movement of the part 22 and hence of the shaft 8 to the right, in the direction opposite to the arrow 14, is limited by the springs 20 comprising resilient rings, which are so arranged that they, both by resiliency and by friction, gradually brake a movement of the intermediate shaft 8. The intermediate shaft 8 is provided at its other end with a similar journalling device, and by this means the axial movement of this shaft is limited by friction rings such as at 19 and 20. By this means a damping device is obtained without the use of oil.

According to Fig. 3, the shaft 8 is journalled in a ball-bearing 16 which follows the axial movement of the intermediate shaft 8. The non-rotating ring 23 also follows the axial movement of the shaft 8. The ball bearing 16 serves in this case simultaneously as a radial and as an axial bearing. The ring 23 is connected with an axially movable shaft 24 which passes through a wall 25. If the shaft 8 moves in the direction of the arrow 14, the non-rotating shaft 24 will also move to the same extent in the same direction, whereby the spring 20 is put under tension, while the spring 19 expands. Simultaneously oil is pressed from the space 26 to the space 27 through openings in the intermediate wall 25. If the shaft moves in the opposite direction, the spring 19 will be put under tension, while the spring 20 expands, and at the same time, oil is transferred from the space 27 to the space 26 through the openings 28. These openings 28 are so calculated with respect to their size and number that the oil passage through the wall 25 is effected sufficiently slowly in order that the device in question shall receive the calculated degree of damping. In this case it is not necessary that the intermediate shaft 8 is supported at its other end in any other way than that the same can move axially. The whole damping device and the device for automatic adjustment of the intermediate shaft for obtaining uniform tooth-engagement thus is arranged on one end of the shaft only.

According to Fig. 4 the radial bearing 16 comprises a roller-bearing similar to that described in connection with Fig. 2, in which the movements of the intermediate shaft 8 are made possible by movements between the rollers and the outer rim of the roller-bearing. At a rotating extension 8a of the shaft 8 is arranged an axial ball bearing 18 which transfers axial pressure to a cylindrical part 22 in the form of a piston. This part 22 is surrounded on both of its sides by springs 20 and 19 which tend to limit the axial movements of the intermediate shaft. The spaces in which the springs 19 and 20 are situated are filled with oil which is forced by the movement of the piston 22 relatively to the intermediate shaft to leak over from one space to the other, thereby effecting damping of the axial movements of the shaft.

Also in this case the intermediate shaft need not be provided at its other end with corresponding devices and it is only necessary to support the other end of the shaft in such a manner that axial movements are possible.

Devices corresponding to those which have been described in connection with the intermediate shaft 8, are also arranged on the intermediate shaft 9 and further also on other intermediate shafts, in case more than two shafts are to be found in the gearing.

Other embodiments than those described above are feasible, for instance such in which the toothed wheels are rotatably journalled and axially movable or solely axially movable on and with respect to the intermediate shaft, in which case devices such as described above may be made use of. In one embodiment, in which the toothed wheels rotate with intermediate shafts but are axially movable in relation to the intermediate shaft, arrangements are feasible, in which the axial movements of the toothed wheels in relation to the intermediate shafts are limited by means of springs, and damping is obtained by the friction which arises in the contacting surfaces between the toothed wheels and the intermediate shaft during the axial movement of the toothed wheels. Further embodiments could be constructed, for the invention comprises all those embodiments, in which the toothed wheels with or without the shaft on which they are mounted, are axially movable in relation to the toothed wheels with which they cooperate, and adjust themselves in the manner above described for uniform tooth-engagement. The invention further is not dependent on whether the axially movable gears comprise driving pinions and driven toothed wheels or driven pinions and driving toothed wheels, and it comprises devices in or relating to toothed gearings of the kind described having toothed wheels with helical teeth of any known kind.

In connection with a device above described and in accordance with the principle of the present invention, the intermediate shaft, therefore, may have such positions as are suitable for uniform tooth-engagement between the various wheels and pinions, respectively, in the toothed gearing as well as for uniform tooth-pressure between two toothed wheels, independent of fault or faults in the teeth of the latter. The axial movements of the intermediate shaft are also damped by devices above described.

Upon variations in load, especially those which arise in form of a thrust, the intermediate shafts would make a sudden axial movement which, in case there were not arranged a damping device of any kind whatever, would result in a reciprocating axial oscillatory movement. This oscillatory movement is eliminated by damping devices. Further, faults in the toothed gearing may cause speed variations which on account of the teeth of the toothed wheel being helical, are transformed into axial movement in the toothed gearing. These axial movements are also subjected to a damping by devices above described. Also vibrations which arise on account of the rotation of various masses within the gearing, are eliminated by these damping devices. The great axial movement of the intermediate shaft therefore makes possible an appropriate damping, at the same time as it secures balancing of the tooth-pressures as well as uniform tooth-engagement.

What I claim is:—

1. A gearing comprising a driving shaft, a driven shaft, said shafts being axially fixed relative to each other, a plurality of axially movable intermediate shafts, a single helical gear fixed to the driving shaft, gears fixed to each of the intermediate shafts and meshing with the gear on the driving shaft, a single helical gear fixed to the driven shaft, said last mentioned gear having teeth twisted oppositely with respect to the teeth of the driving shaft gear, gears fixed to each of the intermediate shafts and meshing with the gear on the driven shaft, and yieldable means for permitting axial movement of the intermediate shafts to automatically equalize tooth engagement in the gearing and for limiting said axial movement.

2. A gearing comprising a driving shaft, a driven shaft, said shafts being axially fixed relative to each other, a plurality of axially movable intermediate shafts, a single helical gear fixed to the driving shaft, gears fixed to each of the intermediate shafts and meshing with the gear on the driving shaft, a single helical gear fixed to the driven shaft, said last mentioned gear having teeth twisted oppositely with respect to the teeth on the driving shaft gear and at a different angle than the angle of the teeth on the driving shaft gear, gears fixed to each of the intermediate shafts and meshing with the gear on the driven shaft, and thrust bearings for said intermediate shafts comprising yieldable means for permitting axial movement of the intermediate shafts to automatically equalize tooth pressure in the gearing and for limiting said axial movement.

3. A gearing comprising a driving shaft, a driven shaft, said shafts being axially fixed relative to each other, a plurality of axially movable intermediate shafts, a single helical gear fixed to the driving shaft, gears fixed to each of the intermediate shafts and meshing with the gear on the driving shaft, a single helical gear fixed to the driven shaft, said last mentioned gear having teeth twisted oppositely with respect to the teeth on the driving shaft gear and at a different angle than the angle of the teeth on the driving shaft gear, gears fixed to each of the intermediate shafts and meshing with the gear on the driven shaft, and thrust bearings for said intermediate shafts comprising springs for permitting axial movement of the intermediate shafts to automatically equalize tooth pressure in the gearing and for limiting said axial movement.

4. A gearing comprising a driving shaft, a driven shaft, said shafts being axially fixed relative to each other, a plurality of axially movable intermediate shafts, a single helical gear fixed to the driving shaft, gears fixed to each of the intermediate shafts and meshing with the gear on the driving shaft, a single helical gear fixed to the driven shaft, said last mentioned gear having teeth twisted oppositely with respect to the teeth of the driving shaft gear, gears fixed to each of the intermediate shafts and meshing with the gear on the driven shaft, and thrust bearings for said intermediate shafts comprising springs for permitting axial movement of the intermediate shafts to automatically equalize tooth pressure in the gearing and for limiting said axial movement and means for damping axial movement of the intermediate shafts.

5. A gearing comprising a driving shaft, a driven shaft, said shafts being axially fixed relative to each other, a plurality of axially movable intermediate shafts, a single helical gear fixed to the driving shaft, gears fixed to each of the intermediate shafts and meshing with the gear on the driving shaft, a single helical gear fixed to the driven shaft, said last mentioned gear having teeth twisted oppositely with respect to the teeth of the driving shaft gear, gears fixed to each of the intermediate shafts and meshing with the gear on the driven shaft, and thrust bearings for each of said intermediate shafts, said thrust bearings comprising springs yieldable to permit axial movement of the intermediate shafts to automatically equalize tooth pressure on the gearing and fluid pressure means for damping said axial movement.

6. A gearing comprising a driving shaft, a driven shaft, said shafts being axially fixed relative to each other, a plurality of axially movable intermediate shafts, a single helical gear fixed to the driving shaft, gears fixed to each of the intermediate shafts and meshing with the gear on the driving shaft, a single helical gear fixed to the driven shaft, said last mentioned gear having teeth twisted oppositely with respect to the teeth on the driving shaft gear and at a different angle than the angle of the teeth on the driving shaft gear, gears fixed to each of the intermediate shafts and meshing with the gear on the driven shaft, and thrust bearings for each of said intermediate shafts, said thrust bearings comprising springs yieldable to permit axial movement of the intermediate shafts to automatically equalize tooth pressure on the gearing and fluid pressure means for damping said axial movement.

7. A gearing comprising a driving shaft, a gear having helical teeth rigidly secured to said driving shaft, a plurality of intermediate shafts, two gears having helical teeth rigidly secured to each of said intermediate shafts, one gear on each of said intermediate shafts meshing with the gear on said driving shaft, a driven shaft, a gear having helical teeth rigidly secured to said driven shaft, said last mentioned gear meshing with the other of said gears on said intermediate shafts, means for preventing axial movement of said driving and driven shafts, and means permitting limited axial movement of each of said intermediate shafts so that the gears on said intermediate shafts automatically adjust themselves for even distribution of tooth engagements in said gearing, each of said last mentioned means comprising a cylinder containing a body of liquid, a partition in the central part of said cylinder having a restricted liquid passage therethrough, a piston in said cylinder on either side of said partition and means connecting said pistons to the respective intermediate shaft.

8. A gearing comprising a driving shaft, a gear having helical teeth rigidly secured to said driving shaft, a plurality of intermediate shafts, two gears having helical teeth rigidly secured to each of said intermediate shafts, one gear on each of said intermediate shafts meshing with the gear on said driving shaft, a driven shaft, a gear having helical teeth rigidly secured to said driven shaft, said last mentioned gear meshing with the other of said gears on said intermediate shafts, means for preventing axial movement of said driving and driven shafts, said intermediate shafts being journalled in fixed radial bearings and in displaceable thrust bearings so that the intermediate shafts may have a limited axial movement to automatically adjust the gears for even distribution of tooth engagement in the gearing, each of said thrust bearings comprising a cylinder containing a body of liquid, a partition in the central part of said cylinder having a restricted liquid passage therethrough, a piston in said cylinder on either side of said partition and means connecting said pistons to the respective intermediate shafts.

9. A gearing comprising a driving shaft, a gear having helical teeth rigidly secured to said driving shaft, a plurality of intermediate shafts, two gears having helical teeth rigidly secured to each of said intermediate shafts, one gear on each of said intermediate shafts meshing with the gear on said driving shaft, a driven shaft, a gear having helical teeth rigidly secured to said driven shaft, said last mentioned gear meshing with the other of said gears on said intermediate shafts, means for preventing axial movement of said driving and driven shafts, and means permitting limited axial movement of each of said intermediate shafts so that the gears on said intermediate shafts automatically adjust themselves for even distribution of tooth engagements in said gearing, each of said last mentioned means comprising spring means for resisting axial movement of said shaft.

10. A gearing comprising a driving shaft, a gear having helical teeth rigidly secured to said driving shaft, a plurality of intermediate shafts, two gears having helical teeth rigidly secured to each of said intermediate shafts, one gear on each of said intermediate shafts meshing with the gear on said driving shaft, a driven shaft, a gear having helical teeth rigidly secured to said driven shaft, said last mentioned gear meshing with the other of said gears on said intermediate shafts, means for preventing axial movement of said driving and driven shafts, and means permitting limited axial movement of each of said intermediate shafts so that the gears on said intermediate shafts automatically adjust themselves for even distribution of tooth engagements in said gearing, each of said last mentioned means comprising a cylinder containing a body of liquid, a partition in the central part of said cylinder having a restricted liquid passage therethrough, a piston in said cylinder on either side of said partition, means connecting said pistons to the respective intermediate shafts and spring means between said partition and said piston.

11. A gearing comprising a driving shaft, a gear having helical teeth rigidly secured to said driving shaft, a plurality of intermediate shafts, two gears having helical teeth rigidly secured to each of said intermediate shafts, one gear on each of said intermediate shafts meshing with the gear on said driving shaft, a driven shaft, a gear having helical teeth rigidly secured to said driven shaft, said last mentioned gear meshing with the other of said gears on said intermediate shafts, means for preventing axial movement of said driving and driven shafts, and means permiting axial movement of said intermediate shaft through a distance of at least fifty times the amount corresponding to the fault of a tooth.

In testimony whereof, I have affixed my signature.

ALF LYSHOLM.